US009112931B1

(12) United States Patent
Morrison et al.

(10) Patent No.: US 9,112,931 B1
(45) Date of Patent: Aug. 18, 2015

(54) SYSTEMS AND METHODS FOR ENABLING DIALOG AMONGST DIFFERENT PARTICIPANT GROUPS

(71) Applicant: Rushline, LLC, Scottsdale, AZ (US)

(72) Inventors: Daniel Morrison, Scottsdale, AZ (US); Martin Sielaff, Chandler, AZ (US); Todd Fletcher, Mesa, AZ (US)

(73) Assignee: Rushline, LLC, Scottsdale, AZ (US)

( * ) Notice: Subject to any disclaimer, the term of this patent is extended or adjusted under 35 U.S.C. 154(b) by 0 days.

(21) Appl. No.: 14/525,169

(22) Filed: Oct. 27, 2014

(51) Int. Cl.
| | |
|---|---|
| *G06F 15/16* | (2006.01) |
| *H04L 29/06* | (2006.01) |
| *H04L 29/08* | (2006.01) |
| *H04L 12/58* | (2006.01) |
| *G06F 17/30* | (2006.01) |
| *G06F 3/0484* | (2013.01) |
| *H04L 12/18* | (2006.01) |

(52) U.S. Cl.
CPC .......... *H04L 65/403* (2013.01); *G06F 3/04842* (2013.01); *G06F 17/30864* (2013.01); *H04L 12/1818* (2013.01); *H04L 51/046* (2013.01); *H04L 51/32* (2013.01); *H04L 67/26* (2013.01); *G06F 17/3089* (2013.01); *H04L 12/185* (2013.01); *H04L 12/1813* (2013.01)

(58) Field of Classification Search
CPC ....... H04L 12/581; H04L 51/04; H04L 51/24; H04L 67/26; H04L 12/1813; H04L 12/1818; H04L 12/185; H04L 51/32; H04L 65/403; G06F 17/3089
See application file for complete search history.

(56) References Cited

U.S. PATENT DOCUMENTS

| | | |
|---|---|---|
| 5,794,219 A | 8/1998 | Brown |
| 6,023,685 A | 2/2000 | Brett et al. |
| 6,026,383 A | 2/2000 | Ausubel |
| 6,460,038 B1 * | 10/2002 | Khan et al. ............................ 1/1 |
| 6,515,681 B1 | 2/2003 | Knight |
| 6,525,747 B1 | 2/2003 | Bezos |
| 6,704,713 B1 | 3/2004 | Brett |
| 6,901,394 B2 | 5/2005 | Chauhan et al. |
| 7,092,821 B2 | 8/2006 | Mizrahi et al. |
| 7,233,940 B2 | 6/2007 | Bamberger et al. |
| 7,596,578 B1 | 9/2009 | Marks |
| 7,801,879 B2 | 9/2010 | Jones |
| 7,848,971 B1 | 12/2010 | Mori et al. |

(Continued)

FOREIGN PATENT DOCUMENTS

| | | |
|---|---|---|
| CA | 2237441 C | 2/2001 |
| DE | 103 45 206 A1 | 6/2005 |

(Continued)

OTHER PUBLICATIONS

Ardichvili et al., "Motivation and barriers to participation in virtual knowledge-sharing communities of practice", Journal of Knowledge Management, vol. 7 No. 1 2003, pp. 64-71.

(Continued)

*Primary Examiner* — Jeong S Park
(74) *Attorney, Agent, or Firm* — Brad Bertoglio

(57) ABSTRACT

An electronic communication system, such as a question-and-answer service, is provided in which a user submitting a question specifies one or more recipients of the question. Authenticated responses by a recipient are published to the asker and other recipients. Responses may be made available to external users, with content contributors being either publicly identified or anonymous.

22 Claims, 11 Drawing Sheets

(56) References Cited

U.S. PATENT DOCUMENTS

| | | |
|---|---|---|
| 8,239,461 B2 | 8/2012 | Jones et al. |
| 8,275,736 B2 | 9/2012 | Guo et al. |
| 8,321,246 B1 * | 11/2012 | Shah .................................. 705/5 |
| 8,392,360 B1 | 3/2013 | Dicker et al. |
| 8,516,379 B2 | 8/2013 | D'Angelo et al. |
| 8,522,152 B2 | 8/2013 | Baldwin et al. |
| 8,539,027 B1 | 9/2013 | Chen et al. |
| 8,539,359 B2 | 9/2013 | Rapaport et al. |
| 8,549,412 B2 | 10/2013 | Brezina et al. |
| 8,589,807 B2 | 11/2013 | Baldwin et al. |
| 8,725,767 B1 | 5/2014 | Wood et al. |
| 8,812,423 B1 | 8/2014 | Kurniawati et al. |
| 2002/0023041 A1 | 2/2002 | Brett |
| 2004/0054737 A1 | 3/2004 | Daniell |
| 2004/0181549 A1 | 9/2004 | Pate |
| 2005/0144115 A1 | 6/2005 | Brett |
| 2007/0259325 A1 | 11/2007 | Clapper |
| 2008/0086366 A1 | 4/2008 | Concordia et al. |
| 2008/0162654 A1 * | 7/2008 | Corfee et al. .................. 709/206 |
| 2008/0195605 A1 | 8/2008 | Wolf-Soffer |
| 2008/0229362 A1 | 9/2008 | White et al. |
| 2008/0282204 A1 | 11/2008 | Del Valle Lopez |
| 2008/0294637 A1 | 11/2008 | Liu |
| 2008/0307320 A1 | 12/2008 | Payne et al. |
| 2009/0112608 A1 | 4/2009 | Abu-Hakima et al. |
| 2009/0210405 A1 | 8/2009 | Ortega et al. |
| 2010/0070554 A1 | 3/2010 | Richardson et al. |
| 2010/0082474 A1 | 4/2010 | Beaumont |
| 2010/0306645 A1 | 12/2010 | Roulland et al. |
| 2011/0016179 A1 | 1/2011 | Bechtel |
| 2011/0041082 A1 | 2/2011 | Nguyen |
| 2011/0185025 A1 * | 7/2011 | Cherukuri et al. ............ 709/206 |
| 2011/0246910 A1 | 10/2011 | Moxley et al. |
| 2012/0023418 A1 | 1/2012 | Frields et al. |
| 2012/0066618 A1 | 3/2012 | Barker et al. |
| 2012/0143972 A1 | 6/2012 | Malik et al. |
| 2012/0167007 A1 | 6/2012 | Ross et al. |
| 2012/0171654 A1 | 7/2012 | D'Angelo et al. |
| 2012/0173992 A1 | 7/2012 | D'Angelo et al. |
| 2012/0246575 A1 | 9/2012 | Baldwin et al. |
| 2013/0132866 A1 | 5/2013 | Shafique |
| 2013/0191762 A1 * | 7/2013 | Rajagopalan et al. ......... 715/753 |
| 2013/0217416 A1 * | 8/2013 | Matthews et al. ........... 455/456.2 |
| 2013/0246518 A1 * | 9/2013 | Nace .............................. 709/204 |
| 2013/0311899 A1 | 11/2013 | Guiro et al. |
| 2014/0019877 A1 * | 1/2014 | Pretti et al. .................... 715/753 |
| 2014/0087808 A1 | 3/2014 | Basallo et al. |
| 2014/0089418 A1 * | 3/2014 | Davenport et al. ........... 709/206 |
| 2014/0282098 A1 | 9/2014 | McConnell |
| 2014/0365919 A1 * | 12/2014 | Shaw et al. .................... 715/753 |

FOREIGN PATENT DOCUMENTS

| | | |
|---|---|---|
| EP | 2287787 A1 | 2/2011 |
| FR | 2658635 A1 | 8/1991 |
| WO | WO 0137509 A2 | 5/2001 |
| WO | WO 2004042630 A2 | 5/2004 |
| WO | WO 2007052285 A2 | 5/2007 |

OTHER PUBLICATIONS

Ackerman et al., "Answer Garden 2: Merging Organizational Memory with Collaborative Help", ACM 0-89791-765-0/96/11, 1996, Cambridge, MA, USA.

Doerner et al., "Supporting Expertise Awareness: Finding Out What Others Know", CHIMIT'07, ACM 1-59593-635-6/07/0003, 2007, Cambridge, MA, USA.

Ehrlich et al., "Searching for Experts in the Enterprise: Combining Text and Social Network Analysis", Group'07, ACM 978-1-59593-845-9/07/0011, 2007, Sanibel Island, Florida, US.

McDonald et al., "Expertise Recommender: A Flexible Recommendation System and Architecture", CSCW'00, ACM 1-58113-222-0/00/0012, 2000, Philadelphia, PA, USA.

Web site for Jelly app at www.jelly.co, taken Oct. 16, 2014.

Constine, "Facebook's Josh Miller Confirms He's Built Something, But It's Not Just About Anonymity", TechCrunch (Oct. 8, 2014), http://techcrunch.com/2014/10/08/facebook-anon/ (Oct. 8, 2014).

Submission of Prior Art Under 37 CFR 1.501, In re: US Patent No. 7,801,879, submitted Nov. 17, 2010.

Web site for ChaCha Search at http://about.chacha.com/about/faqs/, taken Oct. 16, 2014.

Office Action mailed in connection with Applicant's co-pending U.S. Appl. No. 14/595,853, filed May 8, 2015.

* cited by examiner

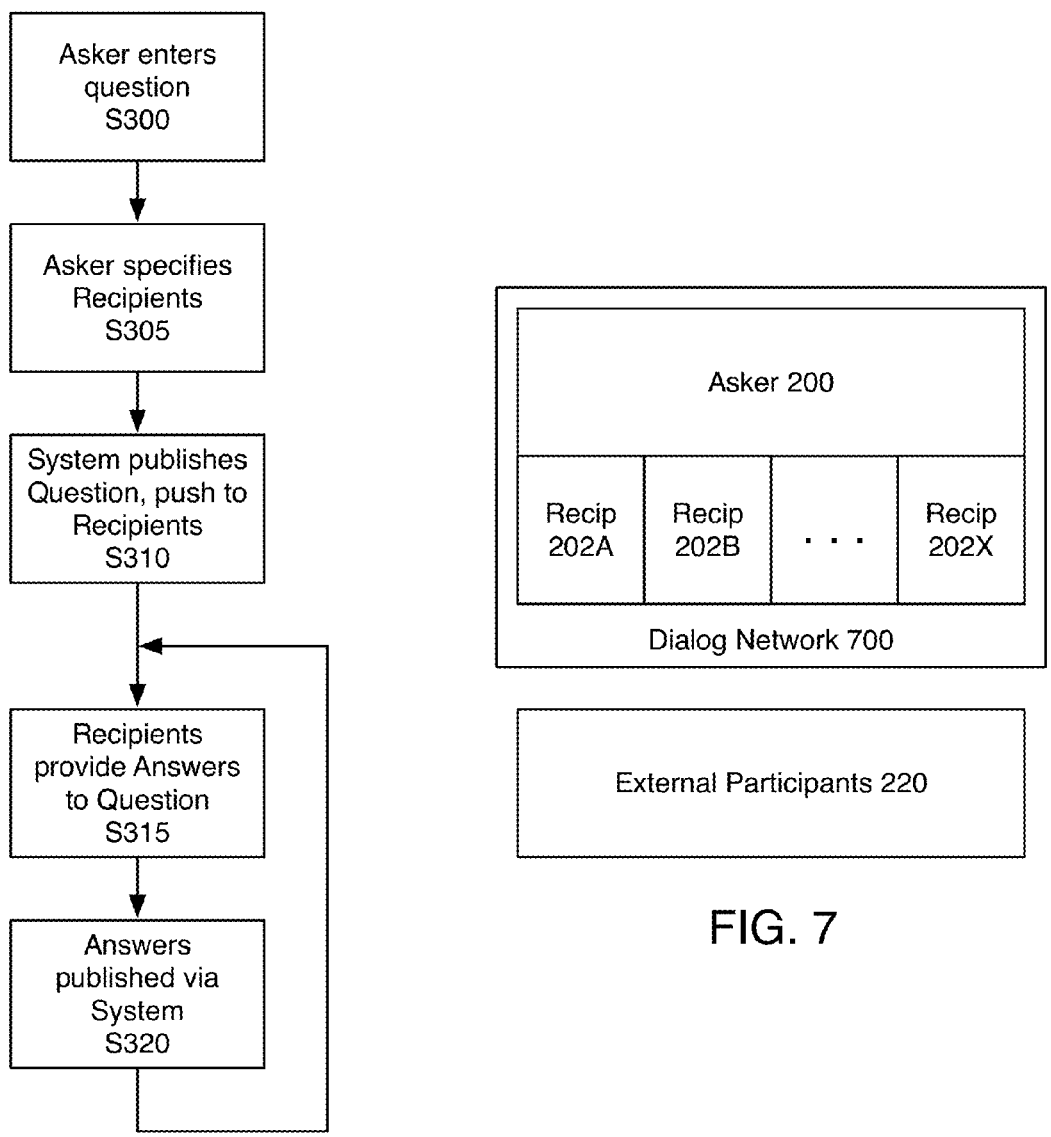

- 600 -

Hi John! Dan asked:

Any good use for color lens filters?   - 605 -

I just found a bunch of old color lens filters laying around from my film camera days. Some of them fit my new DSLR lenses. Is there any use for these things nowadays or would you just post-process the digital files to get the same effect?
- 610 -

1 person has replied to Dan's question.
— 615

What do you think?

enter text

- 620 -

The following people are in on this conversation:

You (John.Doe@localhost.com)
Jane Smith (480-555-0100)
Bob Smartola (480-555-1212)
Dan Maker (dan@localhost.com)

635

- 625 -

☑ Withhold my identity from the public     Submit!  or Cancel

☑ Conceal my identity from everybody except Dan, who 640
originally asked this question.   636

Replies:
Generally, no. You can use a UV filter to protect your lens. Otherwise, just the rare situation when a color filter can help even exposure in all channels (e.g. underwater to cut blue channel intensity). *Jane Smith*    Reply

SYSTEMS AND METHODS FOR ENABLING DIALOG AMONGST DIFFERENT PARTICIPANT GROUPS

TECHNICAL FIELD

The present disclosure relates in general to data processing techniques, and in particular to systems and methods for network-based communication of questions and answers or other dialog amongst different participant groups.

BACKGROUND

Electronic communication is a method for exchanging digital messages and information amongst multiple individuals. Electronic communication may operate across the Internet or other electronic communication networks. Examples of electronic communication include email, mobile and computer applications ("apps"), Short Messaging Service (SMS) communication, Multimedia Messaging Service (MMS) communications and web-based applications facilitating conveyance of information using a web browser.

Electronic communications have become a primary method by which people communicate information. One form of electronic communication that has become particularly popular is online question-and-answer services. In general, a question-and-answer service is a service that allows its end users to engage in dialog by posting questions or other opening content, posting responses to such content, and/or viewing content including responses to questions that others have posted. In some systems, ongoing dialog can occur amongst multiple participants and users contribute content and respond to content contributed by others. Thus, Q&A services primarily act to store, organize and facilitate the distribution of user-generated content.

In many existing question-and-answer services, users ask questions to a predefined community of users registered with the service. Often, questions are organized within predefined topics in order to aggregate users having a common interest in the subject matter. After a question is submitted, the asker waits for a qualified member to see the question, and hopefully, respond with a relevant, informative and accurate response.

Existing Q&A models typically rely on attracting audiences of primarily strangers around specific topics, with the hope that human nature and shared interests will lead users to help one another. The self-selecting nature of these communities, and the fact that users typically do not know each other outside of the community, can lead to a wide variety of responder backgrounds and qualification levels. Many responders may be unqualified from the subjective viewpoint of the asker, resulting in unwanted and low quality answers for both the asker and future readers of the dialog. Existing solutions to this challenge, such as point systems or cumbersome biographical information collection, raise the hurdle to participation and often discourage qualified contributors.

Some systems attempt to provide question-and-answer functionality with open-ended subject matter and no inherent system of organization. However, in such systems a wide diversity of subject matters may inhibit the formation of an active user community within any given topic, which may in turn yield significant delays between the time a question is asked and the time a meaningful answer is received.

Other prior question-and-answer systems implement subject matter specialization in order to promote development of an active community providing timely and high quality answers. However, such systems may require a large user base in order to ensure that a sufficient number of users with relevant knowledge and motivation to respond are regularly viewing questions to provide answers in a timely manner. Attracting and maintaining a sufficient user base that is ready, willing, and capable of engaging in timely, productive dialog, can be challenging and elusive for any site operator.

SUMMARY

The present disclosure describes systems and methods for electronic communications amongst numerous individuals, in which an opening user directs a question or other invitation for content to specific target responders, while also making dialog content available to (and potentially enabling contributions from) others. The system can be implemented on one or more network-connected servers communicating with a plurality of user devices via one or more digital communication networks, such as the Internet and cellular networks. Dialog content can be presented via, e.g., web site, a user-installed application, or directly within notifications.

In accordance with one aspect, the servers provide push notifications to various participants under certain conditions. For example, target recipients identified by the opening user receive push notification of opening dialog content to an electronic contact address specified by the opening user. If a target recipient responds to the opening notification, such as by clicking an embedded URL, the servers configure default notification settings for that target recipient to receive further push notifications of additional dialog content contributions by the opening user or other target responders. Dialog and user identifiers can be included within the push notification to enable automated identification and/or authentication of a target recipient responding to the notification. Push notifications can include email notifications when an opening user specifies a target recipient's email address, mobile network messaging service notifications (e.g. SMS or MMS) when an opening user specifies a target recipient's mobile telephone number, or mobile app push notifications.

Operating logic can control if and when a given user is provided with push notifications. In some embodiments, a target responder can be presented with an option to opt into or out of further push notifications upon responding to a notification or otherwise accessing dialog content. In other embodiments, a target respondent automatically receives push notification of dialog network member contributions upon being identified as a target recipient, unless they opt out. Target responders may be required to authenticate their association as a target responder for a particular dialog.

In accordance with another aspect of embodiments described herein, the content within a view of a dialog presented to a given user may depend upon the association of that user to, e.g., the particular dialog being viewed. One such type of content is the identity of people who contribute to a dialog. A system facilitates interaction between two or more people conducted via a networked database, in which some group of people can see and participate in the dialog, but only a subset of that group can view author attribution. Specifically, personally identifiable information (such as name or email address) corresponding to the contributor of dialog content can be included or excluded from a view presented to a viewer, depending on the viewer's status. For example, a target responder can be presented with a dialog view that includes, along with dialog content contributions from the opening user or target responders, the names of the opening user or target responder that contributed the content. Meanwhile, personally identifiable information associated with, e.g., target responders, can be excluded from a dialog view provided to external users.

Dialog views may also include different subsets of dialog content, based on the viewer's association with the dialog. For example, target responders may, by default, be presented with views including only dialog content from the opening user or other target responders, excluding content from external users. In this way, the target responders may achieve certain advantages a private conversation amongst a known group, while still making their contributions available to a broader audience. Optionally, external users may, by default, be presented with a view including all dialog content.

In accordance with another aspect of embodiments described herein, responses from target responders can be pre-validated to avoid a need for interactive authentication by the target responder. Pre-validation can be achieved by, for example, including a user identifier within system notifications, which identifier can be sent back to the servers in connection with a response and correlated with the target responders specified by the opening user.

Some embodiments enable reuse of dialog networks. Dialog network members can automatically generate new dialogs using the membership of a prior dialog of which they were a dialog network member.

Various other objects, features, aspects, and advantages of the present invention and embodiments will become more apparent from the following detailed description of preferred embodiments, along with the accompanying drawings in which like numerals represent like components.

BRIEF DESCRIPTION OF THE FIGURES

FIG. 3 is a process for Q&A communications.

FIG. 6 is a user interface for answering a question, in accordance with one embodiment.

FIG. 7 is a dialog network block diagram.

DETAILED DESCRIPTION

Figure 1:
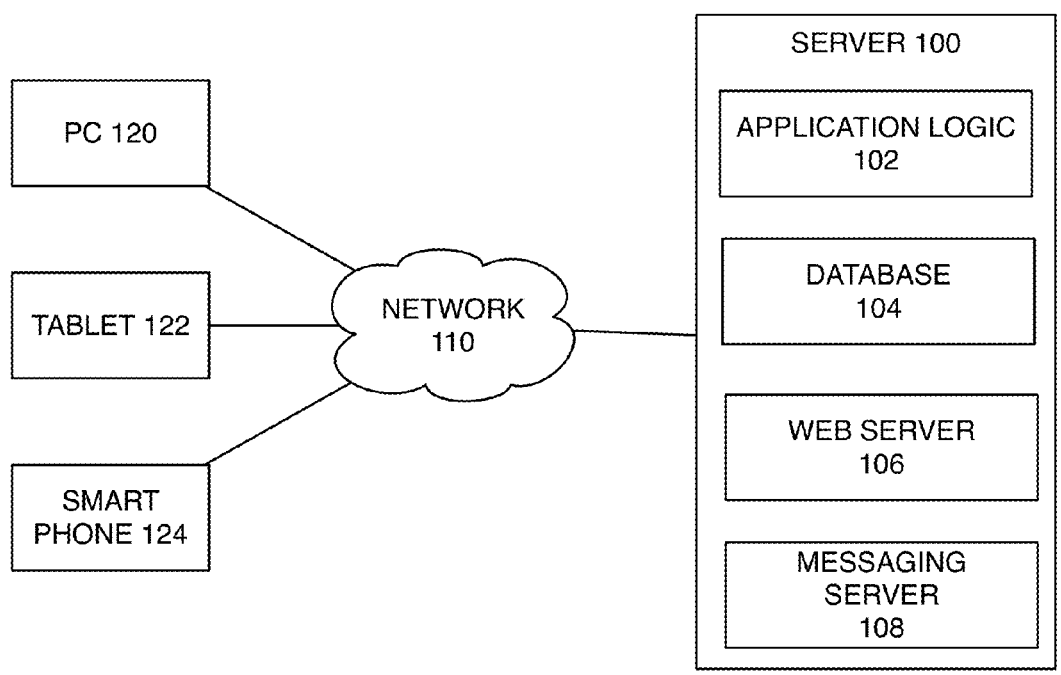
FIG. 1 is a schematic block diagram of a question-and-answer system, in accordance with a first embodiment.

While this invention is susceptible to embodiment in many different forms, there are shown in the drawings and will be described in detail herein several specific embodiments, with the understanding that the present disclosure is to be considered as an exemplification of the principles of the invention to enable any person skilled in the art to make and use the invention, and is not intended to limit the invention to the embodiments illustrated.

From the perspective of its end users, the value of a question-and-answer service depends significantly on multiple factors. Such factors may include: how convenient it is to post a question; the extent to which users receive accurate, insightful and meaningful answers to their questions; the timeliness in which users receive answers to their questions; the ease with which users can contribute answers to the system; the extent to which spam and unhelpful content contributions can be minimized; the extent to which users may avoid reputation risk and undesired or inadvertent sacrificing of user privacy; and the extent to which users can easily locate and view previous useful conversations other people have had on the topic of their questions.

FIG. 1 is a schematic block diagram of an embodiment of a question-and-answer communications system. Server 100 communicates, inter alia, via computer network 110, which may include the Internet, with user devices such as personal computer 120, tablet computer 122 and smart phone 124. Server 100 implements application logic 102, and operates to store information within, and retrieve information from, database 104. The term "database" is used herein broadly to refer to an indexed store of data, whether structured or not, including without limitation relational databases and document databases. Web server 106 hosts one or more Internet web sites enabling outside user interaction with, amongst other things, application logic 102 and database 104. Messaging server 108 enables messaging, such as mobile network messaging service (e.g. SMS or MMS), email, or application notifications, between server 100 and user devices 120, 122 and/or 124.

While depicted in the schematic block diagram of FIG. 1 as a block element with limited sub elements, as known in the art of modern web applications and network services, server 100 may be implemented in a variety of ways, including via distributed hardware and software resources and using any of multiple different software stacks. Server 100 may include a variety of physical, functional and/or logical components such as one or more each of web servers, application servers, database servers, email servers, SMS or other messaging servers, and the like. That said, the implementation of server 100 will include at some level one or more physical servers, at least one of the physical servers having one or more microprocessors and digital memory for, inter alia, storing instructions which, when executed by the processor, cause the server to perform methods and operations described herein.

Figure 2:
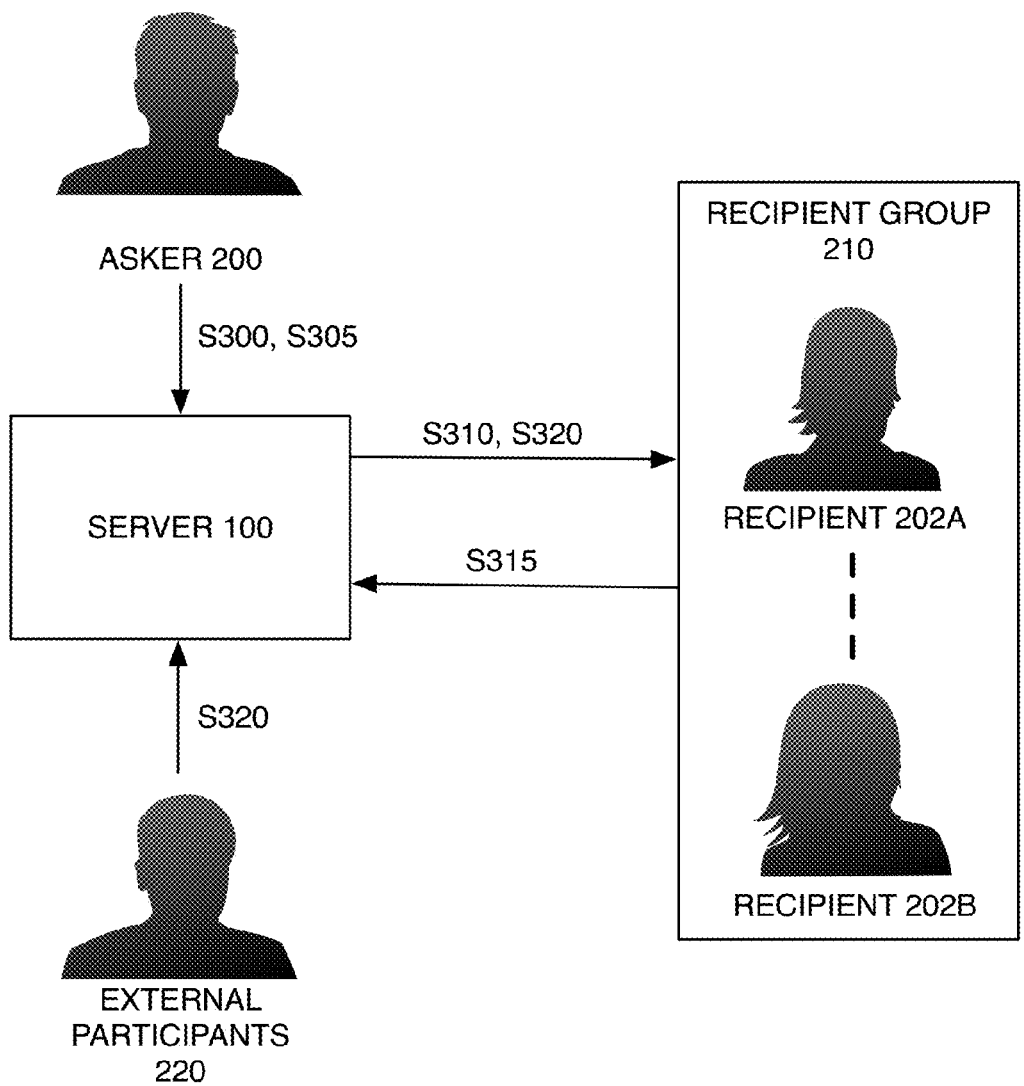
FIG. 2 is a schematic block diagram of participants in a Q&A dialog.

The communication system of FIG. 1, executing application logic 102, can be utilized to implement question-and-answer communication services amongst the individuals illustrated in FIG. 2. Such individuals include asker 200, recipient group 210 which includes one or more recipients 202, and one or more external participants 220. Asker 200 and recipient group 210 can be collectively referred to as dialog network members. Individuals other than asker 200 and recipient group 210, whether previously registered with servers 100 or not, fall within the group of external participants 220.

FIG. 3 is a flowchart illustrating an exemplary process by which the individuals depicted in FIG. 2 utilize the communications system of FIG. 1. In step S300, asker 200 communicates a question to server 100, and accordingly application logic 102. The question can be conveyed via any of several communication methods, including, without limitation: entry into a web page rendered in web browser software on a device such as PC 120, tablet 122 or smartphone 124 in communication with web server 106; entry into a mobile app installed locally on tablet 122 or smartphone 124 and communicating with server 100; or transmission via SMS or MMS messaging from smart phone 124 to messaging server 108. It is contemplated and understood that different embodiments may utilize one or more such mechanisms for conveying questions, in varying combinations, depending upon the desired characteristics of the system implemented.

Figure 4:
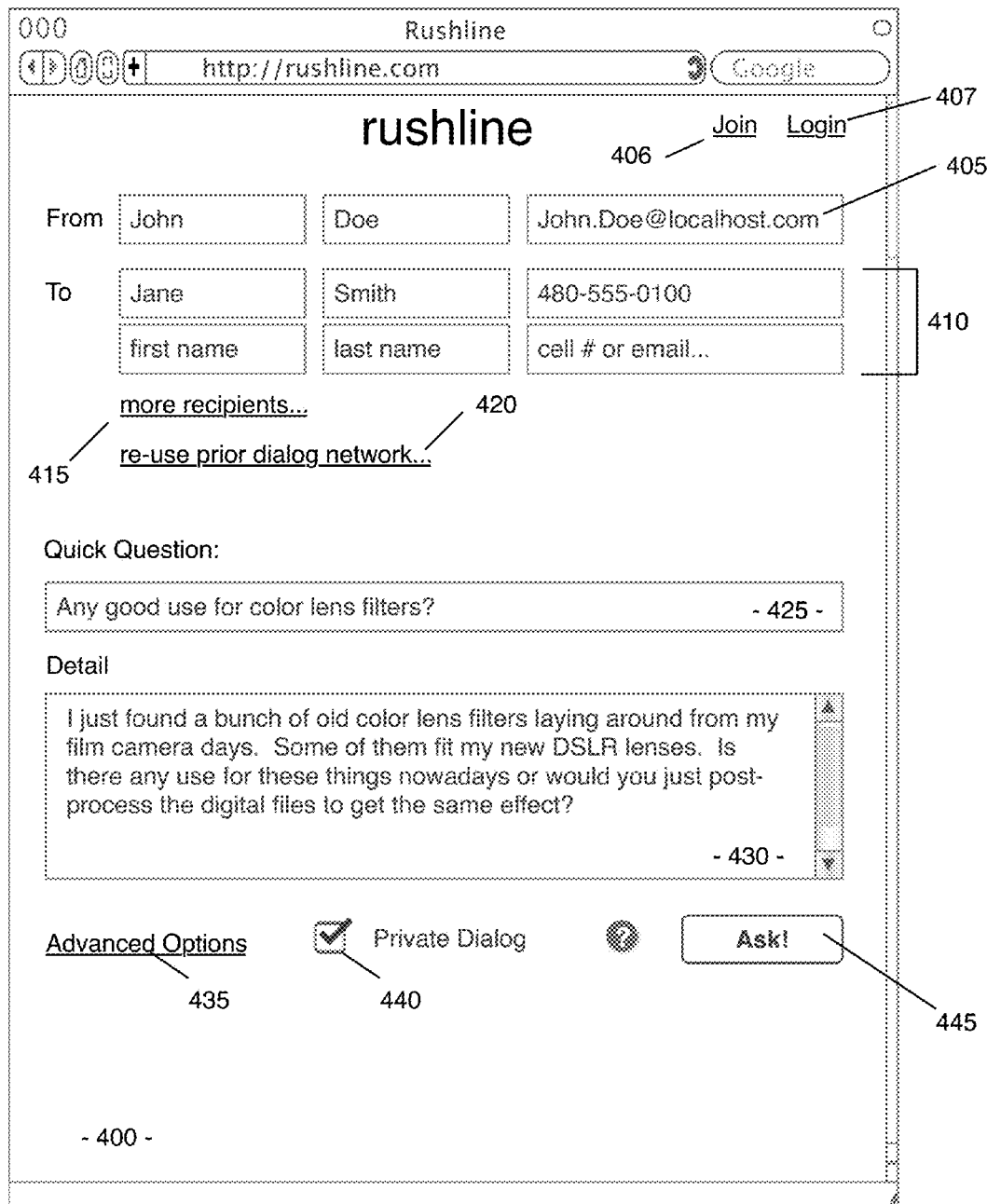
FIG. 4 is a user interface for submission of a question.

FIG. 4 illustrates an exemplary user interface for communication of a question to server 100. Web page 400 is rendered on a user device via communication between the user device and web server 106. Text entry fields 405 are provided for asker 200 to enter their contact information, in the event that asker 200 has not already joined the service and created a user account using link 406, or logged in to a preexisting user account using link 407. Asker 200 can enter opening dialog content, such a question, using text entry field 425 for a question summary, and text entry field 430 for question detail.

In step S305, asker 200 specifies recipients 202 within recipient group 210. For example, in some embodiments, asker 200 may be required to directly enter some form of electronic contact address (such as email address, mobile phone number for SMS/MMS messaging, username for messaging applications such as Skype or Apple Messages) for each recipient 202 within recipient group 210. In the user interface of FIG. 4, fields 410 are provided for asker 200 to manually enter question recipient information. Link 415 is provided to allow asker 200 to specify additional users by entering additional recipients manually, selecting from a user-specific address book (if logged in), or selecting from previously-configured dialog networks (explained further below).

Preferably, askers are prompted by the system to enter first and last names for each recipient, as reflected in FIG. 4 and fields 410. A special privilege with which the asker and recipients can then be provided is to always see the first and last name of the asker and each recipient included in the dialog network. In some embodiments, dialog network member information is revealed to other dialog network members regardless of whether the recipient may have configured their first and last name in the system. This is a courtesy to everyone in the dialog network, so that they know whom they are conversing with since the dialog network members may be able to see each other's posts and associated personally identifiable information. Non-members of the dialog network will preferably never see the list of first and last names as entered by the asker. If a recipient chooses to respond while publicly sharing their first and last name, then that personally identifiable information will be available to users outside the dialog network, but otherwise it will not.

Preferably, recipients 202 are (a) selected from amongst a group of people that asker 200 already knows and trusts, (b) irrespective of whether the recipients have ever used the question-and-answer service, and (c) with no need for the recipients to be part of any online network or any other predefined group. While these characteristics of question recipients are believed to be beneficial, it is understood that other embodiments may be implemented without requiring all or any of these attributes for targeted recipients.

A communications system in which users direct questions to a dialog network, with specific recipients that an asker knows and trusts, may solve numerous problems that can arise in systems where questions are posted generally to system members. For example, a pre-existing relationship between the asker and recipient may increase the likelihood that the recipient will (a) expend the time and effort to respond to the question, and (b) respond in a timely manner. Asking questions to recipients that an asker knows and trusts may also improve the quality of answers, compared to other systems in which questions are available generally for response by any member of the community. Theoretically, recipients may be selected based on the asker's understanding that the recipient has some level of expertise relating to the question, thereby avoiding situations in which content quality is diluted by unqualified or unknowledgeable individuals providing answers.

Implementing a Q&A system enabling participants to communicate directly with people they already know may result in a paradigmatically different quality dynamic for several reasons. For one, the asker is likely to select participants qualified to provide input on the topic at hand; otherwise, the asker likely would not risk bothering or wasting the time of a known colleague by directing a question to an unqualified or uninterested source. Additionally, the fact that people are engaging with other people they already know may lead them to be increasingly thoughtful and honest in their responses to minimize their real life reputation risk within their respected personal networks. Ideally, the asker and the selected group of recipients will collectively form a Minimum Viable Dialog Unit for each question asked, the Minimum Viable Dialog Unit being a group of individuals collectively having sufficient knowledge and expertise to fully answer the question asked without turning to additional resources. Combining a Minimum Viable Dialog Unit with trusted relationships and a supporting electronic communications platform, as described herein, can enable individuals to obtain fast and accurate responses to a wide variety of questions.

Implementing a system in which an asker can direct a question to a recipient without regard for whether the recipient has ever used the system may also provide benefits, as compared to systems in which questions are directed to an existing community user base. This characteristic can operate to increase the pool of individuals providing valuable information to the system, and reduce friction in obtaining responses from qualified individuals (some of which may be hesitant to register with or sign up for a new service). Similarly, enabling a recipient to receive a question without requiring their participation in any particular online network, online system or other predefined group, also operates to maximize the pool of prospective recipients that can provide valuable information, and reduce friction in obtaining responses from qualified individuals.

Figure 5:
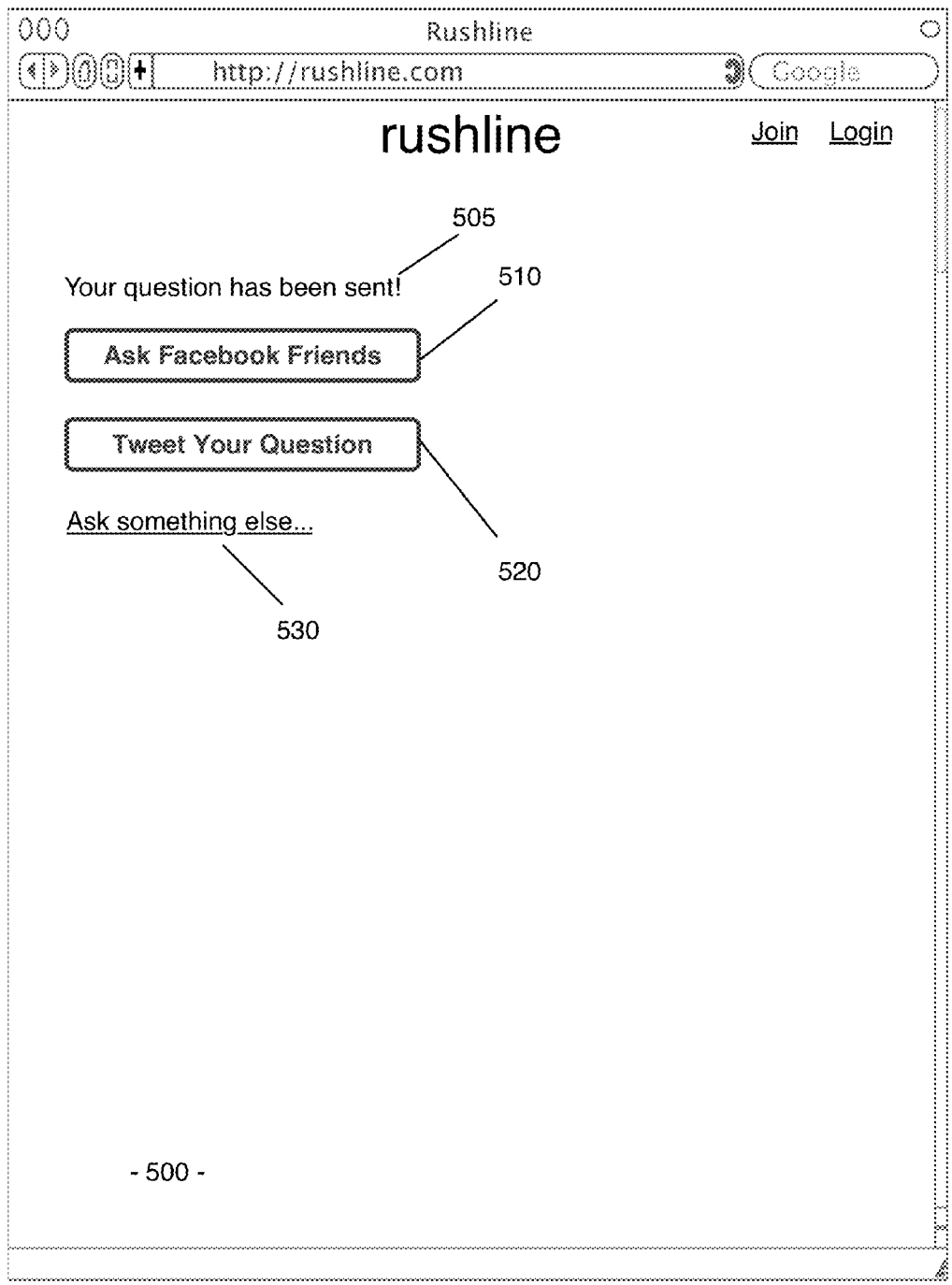
FIG. 5 is a user interface for question submission confirmation.

Once asker 200 specifies a question and recipients, asker 200 can select Ask! button 445 to submit the question information to server 100. FIG. 5 is an exemplary web browser user interface presented to asker 200 after selection of Ask! button 445. Message 505 provides confirmation that the question has been submitted. Buttons 510 and 520 enable a user to publish notification of a question via other communication platforms, such as social networking platforms. Link 530 allows a user to immediately enter another question.

Server 100 then manages ensuing publications, notifications, dialog and answers. In step S310, server 100 operates to publish the question (e.g. by making it available via a web site), and push notifications of a question asked to recipient group 210. Notifications are pushed to recipient group 210 using the contact information provided by asker 200 in step S305 and associated digital communication protocols. For example, if asker 200 provides an email address for a recipient 202, in step S310 server 100 may operate to transmit an email via network 110 and email servers, which email can be received by the corresponding recipient using email application software implemented on the recipient's computing device(s), such as a smartphone, PC or tablet. Email notifications will typically include a hyperlink URL that, if selected by the recipient, launches a local web browser application and initiates communications between the user's device and web server 106 implemented within server 100.

Preferably, hyperlinks included within a notification are uniquely associated with the notification, such that corresponding resource calls to server 100 can be used to identify the recipient and the question to which the recipient is responding, using information within the hyperlink. Hyperlinks can be uniquely associated with the notification by embedding a user identifier unique to that notification within a URL. Similarly, hyperlinks can be uniquely associated with the notification recipient by embedding a user identifier unique to that recipient within a URL. In other embodiments, a URL can act as a dialog identifier, providing a unique association between a notification and a particular dialog. Additionally or alternatively, a unique identifier can be included within the body text of the email; in which case the user may be queried by servers 100 to authenticate by manually entering the identifier for identification. While numerous embodiments can be implemented, preferably one or more identifiers (whether URL, UID, cookies, or other) provide correlation with one or more of the user or user device, the dialog and/or the particular notification.

If asker 200 provides a mobile telephone number for a recipient 202, in step S310 server 100 may operate to transmit a SMS or MMS message via messaging server 108 and network 110 to that user's mobile phone, optionally also including a hyperlink to redirect further interactions to a web application hosted by web server 106.

If a designated recipient has downloaded and installed a dedicated app on the recipient's mobile device, in step S310 notification may be provided via an app notification protocol. In an exemplary embodiment, notifications to users of a mobile app will further receive some or all of the question contents directly within the notification.

Because question notifications in step S310 are directed to specific individuals, by another individual typically known to the recipient, to the recipient it may appear that they were directly contacted by someone they know seeking their help. Furthermore, that contact will often take place using whatever contact method that asker might ordinarily use to contact the recipient for any other reason. By providing a personal communication amongst known associates, it is expected that simplicity of communications and timeliness of responses will be improved compared to other question-and-answer systems, while barriers to participation will be reduced. Barriers to participation can also be reduced to the extent that recipients need not be members and need not become members to learn a question has been asked, or possibly to answer it.

In step S315, any of recipients 202 can submit answers to the question. The term "answer" is used herein to refer to communications responsive to an initial "question" communication. It is contemplated and understood that the term "answers" may include any type of communication responsive to a "question." Further, it is contemplated and understood that the term "question" may include any number of types of opening communications intended to lead to an exchange of thoughts or opinions between multiple users. For example, a "question" could include a request for clarification or additional information by the asker, or an invitation to comment on a document, news article or other topic. In this way, communication system embodiments described herein can be utilized broadly as dialog engines, facilitating the exchange of communications, such as ideas or opinions on a particular issue, between two or more people. The asker can also be referred to more broadly as an opening user, to the extent that the asker's communication opens the dialog with other users.

One or more means of communication can be utilized to submit an answer in step S315. FIG. 6 illustrates an exemplary user interface for submission of an answer by a recipient 202. Web page 600 is rendered on a user device via communication between the user device and web server 106 implemented within server 100, in response to selection of a URL within a question notification in step S310. Fields 605 and 610 state the question to which a response is being provided. Field 615 notifies the user of the number of replies to date, and provides a link to view those replies, which are also displayed lower on the page in region 645. Text entry field 620 enables a user to enter their response. Field 625 provides the respondent with an indication of the individuals within the dialog network, who will be notified of responses to the question and who will see a list of other people in the dialog network even if the dialog has been marked "private" by the asker (see more below). While the embodiment of FIG. 6 shows both names and contact addresses within field 625, it is contemplated and understood that in other embodiments, it may be desirable to provide names without contact addresses in field 625, in order to provide greater confidentiality to participants. When the user has finished entering an answer into field 620, selection of button 640 advances the process of FIG. 3 to step S320.

In step S320, answers provided in step S315 are published. Preferably, the publication in step S320 includes making answer content publicly available via request to networked database 104. Making answer content available via request to a networked database 104 can be achieved in a number of ways, some or all of which may be provided simultaneously. One such way is via an Internet web site implemented by web server 106, communicating with database 104. Another means of making answer content available is via request from a locally-installed application executed on user device 120 and interacting with networked database 104, potentially through an API or application server within server 100. Another is via request from a mobile device application executed locally on user devices 122 and 124 and interacting with networked database 104, again likely through an API or application server within server 100.

Preferably, the electronic communication service will be configurable to provide selective push notification of new content. Asker 200, recipients 202 and external participants 220 can be configured via application logic 102 and messaging servers, to receive direct communication of new content contributed to dialogs with which they have interacted or have some relationship. For example, notifications can be controlled based on, amongst other things, the prospective notification recipient's relationship to the dialog (e.g. role as asker, target recipient, external user). In some embodiments, a question asker may by default receive push notifications of all dialog contributions, whether from target responders or external users. In other embodiments, a question asker may by default receive push notifications of dialog contributions from target responders only, unless the asker expressly opts into receiving notifications of content contributions from external users as well. Target responders may also by default receive push notifications based on their relationship to the dialog as a target responder, with the default scope of notifications including contributions from dialog network members or from all users, depending on system design preferences.

Push notification of new content may also be triggered by a user's interaction with the system and/or a particular dialog. For example, in some embodiments, a target responder may by default receive push notification of all contributions from dialog network members. In other embodiments, a target responder may by default receive push notification of the asker's opening dialog content only, at which point interaction with the communication system by the target responder can change the default push notification setting to opt into notifications of content contributions from dialog network members and/or external users. Interactions controlling default push notification behavior may include receipt by servers 100 of a response from the notification recipient. Such responses include, without limitation: transmission by the recipient user device of an email "read receipt"; transmission by the recipient user device of a messaging delivery confirmation; selection by a recipient user device of a URL included within a notification of dialog content; selection of user interface elements rendered on a user device web browser interacting with servers 100; and selection of user interface elements rendered on a user device locally installed application interacting with servers 100.

Asker 200 may also receive a direct notification via a predetermined form of communication (e.g. email, SMS, app notification), immediately upon receipt by server 100 of an answer from a member of the dialog network by server 100 in step S315. Optionally, asker 200 can configure notifications to further include notifications of answers by external users 220.

Figure 3B:
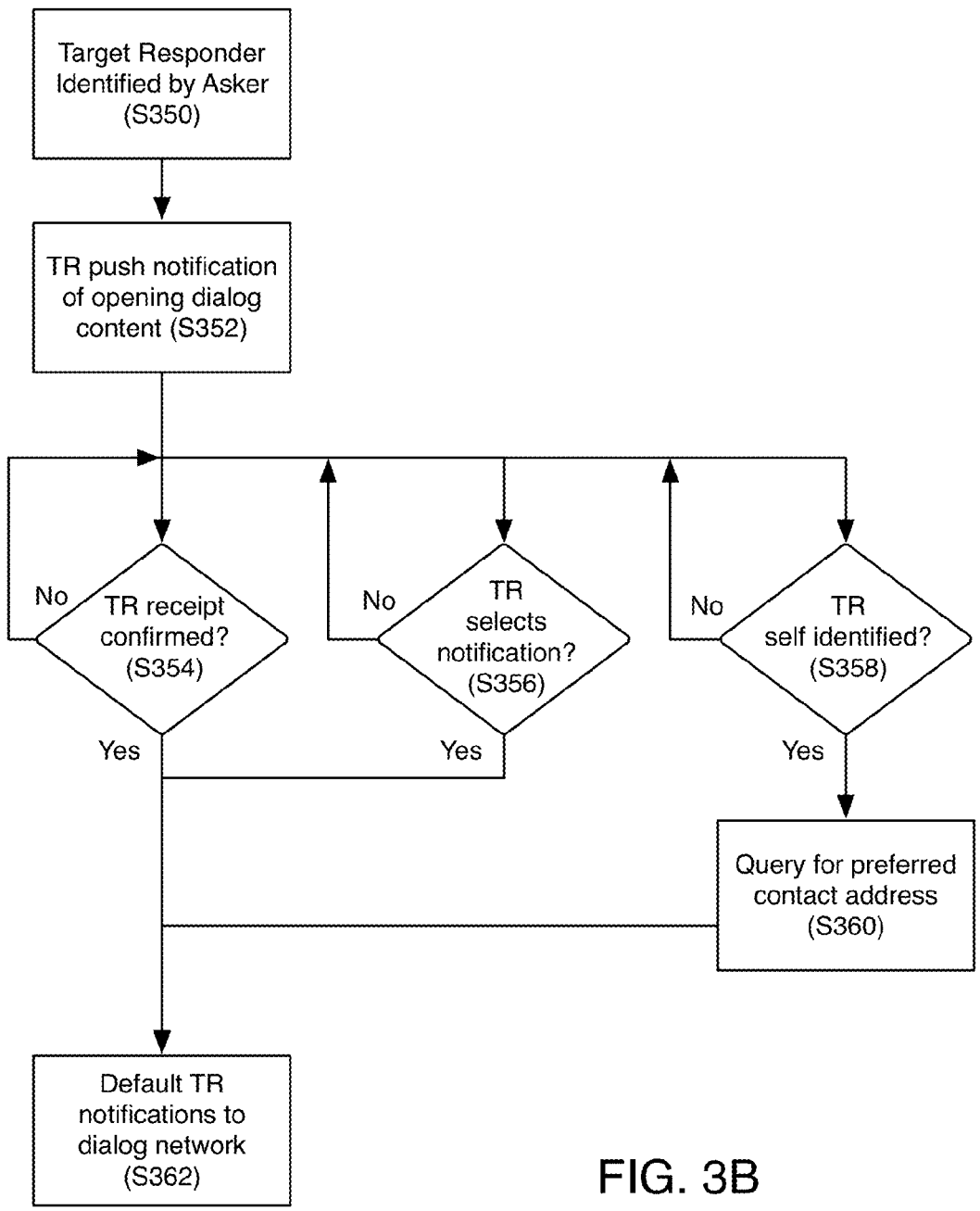
FIG. 3B is a process for controlling default push notifications of dialog content.

Server 100 can also be configured to promptly transmit digital communications containing notification of, and optionally content from, an answer communication of step S315, to one or more members of recipient group 210. FIG. 3B illustrates an exemplary process for managing push notifications to recipient group members in an electronic communication system of the nature described herein. In order to avoid the appearance of "spamming" or undesirably high messaging volume on topics not of interest to the recipient, preferably, answers will only be automatically communicated to a member of recipient group 210 after that member has acknowledged receipt of the original question in some way and has not opted out of further communications regarding the question.

Specifically, in step S350, the asker identifies the target responder. In step S352, servers 100 transmit a push notification to target responders, notifying them of the opening dialog content. Steps S354, S356 and S358 operate in parallel, through which servers 100 await confirmation of notification receipt by the target responder (S354, e.g. email read receipt or messaging platform delivery confirmation); target responder selection or activation of the notification (S356, such as selection of a URL within the notification); or self-identification by the target responder (S358, such as the target responder logging into a web site hosted by servers 100 and entering an identifier or contact address associated with that target responder). If the target responder self-identifies in step S358, the target responder is further queried in step S360 to confirm or self-specify their preferred contact address, which may be different than the contact address specified by the asker in step S350. In any event, upon interaction by the target responder in steps S354, S356 or S358, servers 100 default to providing the target responder with push notification of contributions by the dialog network (step S362).

In addition to facilitating prompt exchange of valuable information amongst users, the communication system described herein also enables a new mechanism for organizing system content. Traditionally, many question-and-answer systems organize their information by topical communities that are predefined and categorized by an intended scope of subject matter. Participants typically self-select membership based on how close of a fit they can find for their specific interests. Users can then configure their associations and notifications based on their interest level. For example, for topical communities of high interest level for a user, the user may configure the system to receive immediate publication of questions and answers via email. For topical communities of less interest level, the user may receive "daily digest" emails summarizing the day's communications. For topical communities of low interest level, the user may receive "weekly digest" emails summarizing communications that took place during the course of a given week. For communities of even lower interest level, the user may receive no notification of new questions and answers, and instead may elect to only view communications when the user logs into a web site for the system or utilizes a mobile app dedicated to the system. As a result, in such conventional question-and-answer systems, a user asking a question or submitting a response in a question-and-answer dialogue may not be able to determine or control if and when any other particular user is notified of the communication, thereby potentially inhibiting effectiveness of such systems as a rapid or reliable platform for question-and-answer communications.

Additionally, to the extent that users self-select into topical subcommunities, topic or forum membership varies over time, users inherently come to and leave from communities as their interests fluctuate. As a result, communities that provide rich interaction on a topic during one question-and-answer exchange, may provide a less valuable interaction during a closely-related exchange taking place at a later time if, e.g., high-value participants in the prior exchange have ceased their participation in the community or subcommunity since the prior exchange, or reduced the frequency of notifications related to that community or subcommunity.

FIG. 7 is a schematic block diagram of an alternative means of organizing communications in a question-and-answer system, in accordance with another aspect of the system illustrated herein. Rather than (or in addition to) providing predefined topical communities into which users self-select, question-and-answer communications are organized via dynamically-created dialog networks. A dialog network is a group of specific individuals invited by a question submitter, who will be notified of a question, and preferably notified of any ensuing dialog in response to that question unless a member opts out of notification. Thus, dialog network 700 typically includes asker 200 and recipients 202 within recipient group 210. External participants 220 may or may not have access to some or all of the information within a dialog, and they may elect to "follow" a dialog, receive notifications just as members of dialog network 700 do, or even post a response, but they are preferably not members of dialog network 700. Dialog network 700 thus becomes a self-contained mini topical discussion group around a particular dialog, until that dialog is complete.

By incorporating dialog networks, system participants can quickly reuse communication groups that have proven valuable in prior communications. Since originators specify a unique audience for each question they ask, each question (or dialog) represents a group of people that the asker may wish to ask other questions to in the future, such as questions that are on the same topic. Similarly, since the audience was selected based on a belief by the originator that each recipient had an inherent interest in the topic, the recipients may also wish to post to that same group again on a similar topic. Therefore, each dialog that a user has started also preferably represents a network that can be reused at any time in the future, without being subject to unknown fluctuations in community membership. Further, a dialog contact group can be customized, added to, combined or removed from for future dialogs to provide an asker with maximum convenience and flexibility.

For example, when an asker specifies recipients in step S305, server 100 may act to store within database 104 a dialog network record that includes the electronic contact addresses associated with the recipients to whom an outbound question message is directed. During subsequent uses of the system, when an asker specifies recipients in step S305, a user interface may be provided such as that of FIG. 4. In addition to manual entry fields 410 and "more recipients" link 415 for specifying question recipients, the asker can select "re-use prior dialog network" link 420 to be presented with a list of recent dialog networks from dialogs in which the user has previously participated. One or more such dialog networks can be selected via user interface elements displayed on a user computing device. Preferably, asker 200 can elect to reuse a prior dialog network as-is in step S305, or modify a prior dialog network by adding or removing recipients from that network. In addition to dialog networks created by a user being available for reuse by that user, preferably recipients will also be able to reuse dialog networks in which they were identified as a recipient, such that those recipients can select a dialog network for reuse in later system use cases in which a former recipient takes on an asker role.

Figure 8:
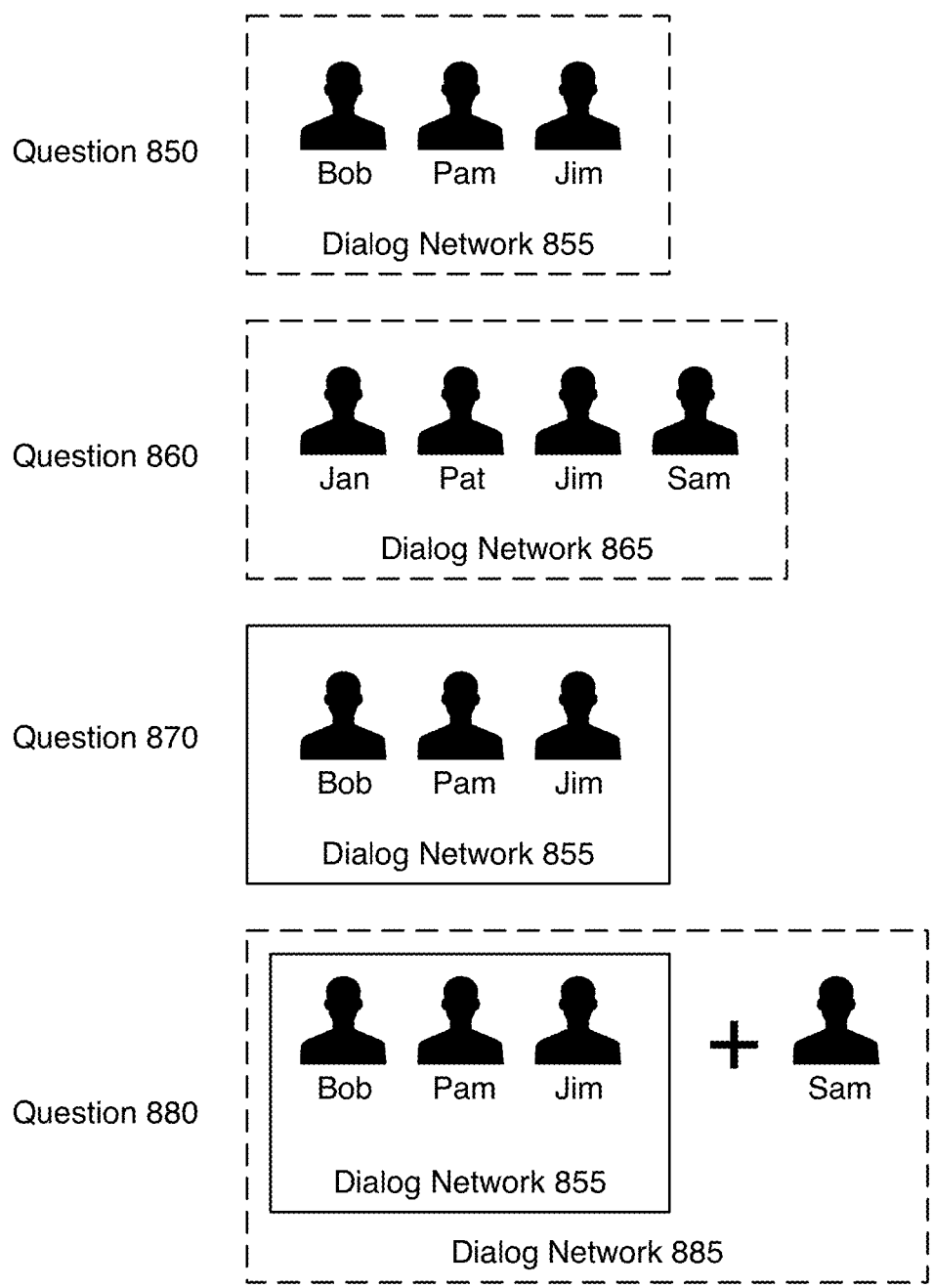
FIG. 8 is a block diagram illustrating dialog network reuse.

FIG. 8 illustrates dialog networks available for re-use by a user. When submitting question 850, the asker manually specifies recipients Bob, Pam and Jim, thereby creating new dialog network 855 that includes those recipients. Later, when submitting question 860, the asker manually specifies recipients Jan, Pat, Jim and Sam, thereby creating new dialog network 865. When submitting question 870, the subject matter of which is similar to that of question 850, the asker can select to re-use prior dialog network 855. When submitting question 880, the asker reuses dialog network 855, but decides to add Sam as a recipient, thereby creating new dialog network 885. In this way, users can quickly engage in new dialogs with existing groups of contacts.

Another way in which embodiments described herein can facilitate participation is by eliminating or minimizing user registration requirements, particularly amongst question recipients. Early Internet discussion forums often allowed any user to post without subscribing. However, this typically led to a large quantity of posts that were often low quality, off topic or spam, sometimes overtaking a community and essentially killing it. As a result, most online forums now require registration prior to posting. The subscription process sometimes even forces users to build networks, choose topics of interest, and configure profiles prior to posting. These high hurdles exclude many people from participating at all, or limits the communities in which a user actively participates.

By contrast, since embodiments described herein enable people to communicate directly with people they already know and simply use the system as a notification and organization mechanism, the system may be implemented without explicit registration by recipients. Authenticity of communications can be confirmed via the source of communications, e.g., from a user that came to the question via a URL within a notification they received containing a unique code, or through a sender's address associated with an email received by server 100 or a mobile phone number associated with an SMS or MMS message. Question recipients need not set up a profile, learn how a community is organized, build a network or take any other activity before meaningfully contributing to the system.

Figure 9:
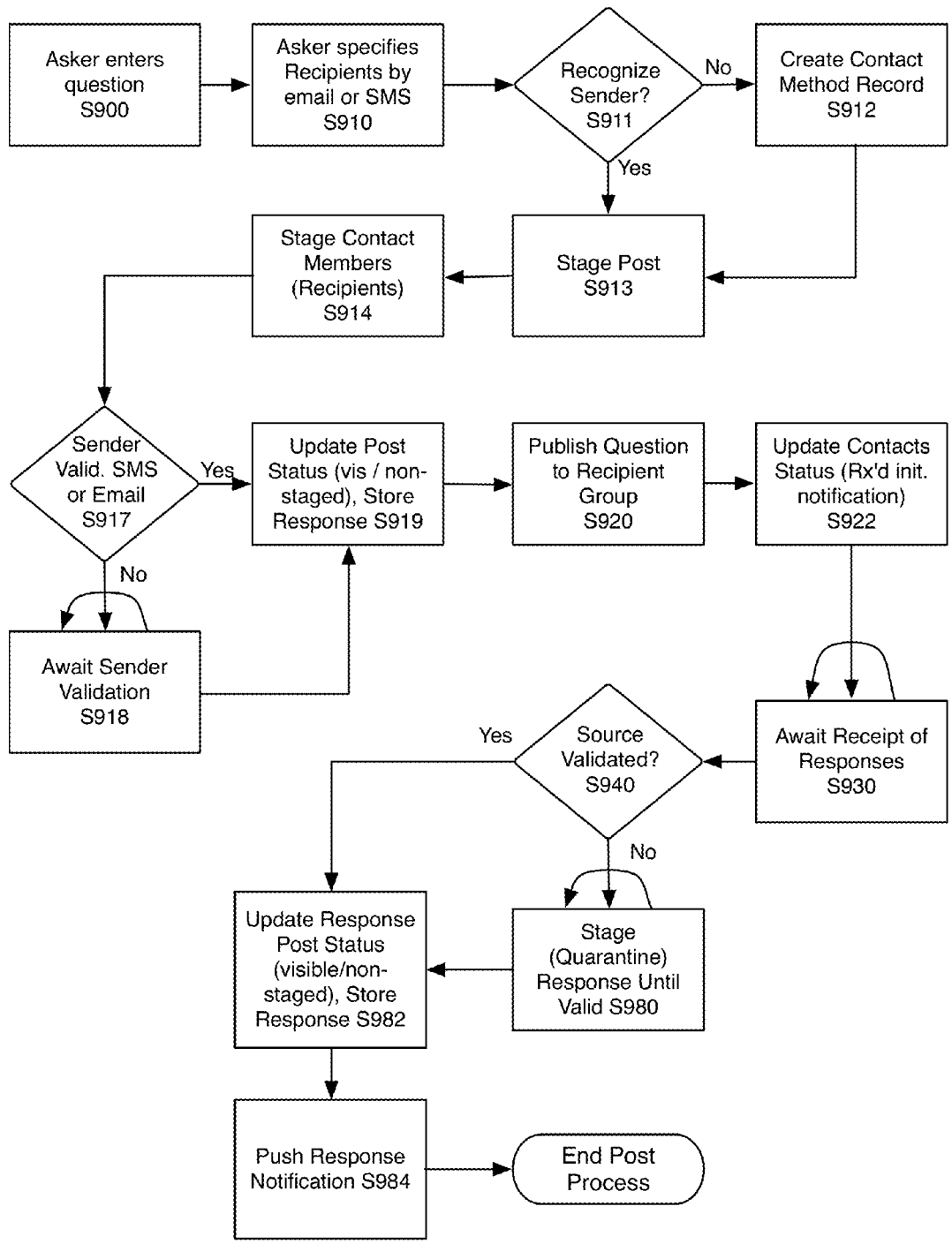
FIG. 9 is a process for Q&A communications, in accordance with another embodiment.

FIG. 9 illustrates an exemplary process by which recipients can participate without prior registration. In step S900, an asker enters a question, analogous to step S300 in FIG. 3. In step S910, the asker specifies a recipient group, each member of the recipient group being identified by an email address or mobile telephone number. In step S911, the system (in this case, server 100) then determines whether the asker is recognized (e.g., via having previously logged into the system or having accessed the system via an authenticated communication method such as mobile app or unique http link). If the asker is recognized, the post is staged within database 104 but flagged as "not visible" such that it does not yet appear within user views (step S913) and the designated recipients are staged (step S914). If the asker is not recognized, a contact method record is first created within database 104 corresponding to the asker (step S912).

In step S917, the system checks to see if the asker communication channel is valid. Validation may be accomplished via any number of ways. If the specified communication channel is a mobile telephone number, a mobile communications network message (such as SMS or MMS) can be sent to the asker's mobile phone with a unique validation code, entry of which is required via a web site user interface prior to validation of the mobile phone number. For validation of an email address, an email can be sent to the specified email address with a unique hyperlink, selection of which is detected by server 100 to validate the email address. Validation of the asker's communication channel helps prevent individuals who do not own an email address or mobile phone number from using the system to send notifications to others.

In some embodiments, it may be desirable to require validation of the contact channel for each dialog. In other embodiments, a contact channel may require validation once, during its first use, after which servers 100 may store confirmation of validation during future communications via that channel. Optionally, validation may expire after a predetermined length of time, after which re-validation of the communication channel is required in step S917. Alternatively, for questions and answers submitted via a web site channel, validation may be achieved by requiring the user to log in to the web site. Known means of authenticating web site users can be implemented in step S917.

If the asker contact channel has not yet been validated, the system awaits validation (step S918). Once the asker communication channel has been validated, in step S919, the post status is updated to "visible, non-staged". In step S920, the system pushes a communication to each recipient in the recipient group via a communication mechanism corresponding to the identification provided by the asker in step S910. E.g. if an asker specifies an email address for a recipient in step S910, an email is transmitted to that recipient in step S920. If an asker specifies a mobile telephone number for a recipient in step S910, a mobile communication network message (such as SMS or MMS) is transmitted to that recipient in step S920. In step 922, the recipient's contact record status is updated within database 104 to reflect receipt of an initial notification for this specific question.

The actual content of the push notifications will vary based on system implementation, and could include some or all of the following: the name of the asker, the subject of the question, all or some portion of the question content, the names of others in the recipient group, and a URL (preferably including a UID) facilitating direct linking to the corresponding dialog content on a web site implemented by web server 106. In some embodiments, it may be desirable to vary the push notification content based on the communication channel via which the notification is transmitted. For example, a SMS notification may include brief content (e.g. "Dan has asked you and 3 others a question. Click the following to see it: http://rl.cc/PvmS8S"). However, an email notification may include more content, such as the asker's name, the list of people in the recipient group, the entire text of the question, and a URL hyperlink to provide an answer or view others' answers.

In step S930, the system awaits receipt of further communications from the asker or any member of the recipient group. If and when an inbound communication is received, the system authenticates the source in step S940.

Source authentication in step S940 can be achieved in a number of ways. In a preferred embodiment, each outbound notification includes a URL with a unique code that the system uses to associate individual dialog network members with a specific dialog. The URL directs the user device (via web browser or locally installed application) to a web server. Preferably, the code is perishable, with an expiration date and time associated with each code. If a user comes to a dialog by way of a URL hyperlink containing a code known to the system, and the code has not yet expired, the system will identify the incoming user as the user previously associated with the code, and determine that the source is authenticated in step S940 without additional user interaction. If a user comes to a dialog by way of a URL hyperlink containing a code known to the system, but the expiration date and time associated with the code has passed, the system will identify the incoming user as the user previously associated with the code, but will query the user to validate their contact address before publishing any subsequent posts or other content contributions. If the user comes to a dialog via a link that did not contain a unique code at all, the system will query the user to enter a contact address, and transmit a communication channel validation communication to which the user must respond; with the communication channel considered validated in step S940 as coming from a dialog network member only if it matches one of the recipient addresses after address validation.

If the inbound communication is not authenticated, in step S980, the response is staged as Quarantined, preferably until the recipient communication channel is validated. In other words, in step S980, the message is handled differently as a result of its being provided by an unauthenticated source. Depending on a particular desired implementation, the outcome of a message being quarantined in step S980 may include, for instance: deletion or discarding of the message; display of the message separately from other, authenticated responses; failure to publish the message via push notification to the asker or recipient group; or publication of the message only to the asker for manual validation by the asker prior to push publication to the recipient group. Preferably, the system provides the submitting recipient with a responsive communication (e.g. a reply email or reply SMS) including an alert that the sender's communication was not accepted due to mismatch between the message source and the recipient contact information. The recipient may further be provided with an opportunity to authenticate their new communication channel. For example, server 100 may transmit an authentication code to the communication source, which must be returned via the contact method originally associated with that recipient by the asker in step S910. If the new communication method is authenticated, the process continues to step S982.

In step S982, the recipient response is stored within database 104 with post status updated to visible/non-staged, such that the response becomes visible within search results and user views of the dialog(s) with which the post is associated. In step S984, notification of the new recipient response is pushed to asker 200 and some or all other members of recipient group 210, as explained in more detail above, e.g., in connection with FIG. 3B.

Another aspect of Q&A systems that may impact user behavior is user identification. Some prior systems allow users to post anonymously, without providing any user-identifiable information. While anonymous posting can reduce barriers to participation, users often feel little or no accountability for the content they publish, which can lead to high volumes of inaccurate, low-value, or spam postings. That, in turn, can drive legitimate users away and lead to a downward spiral in system content quality. As a result, other online communities require the use of a real name and/or personal attributes. While this may lead to higher quality posts, it can sometimes deter people from posting information if they do not want to risk their personal reputation, even if they may otherwise be willing and able to provide a high quality answer.

In accordance with another aspect of embodiments described herein, an online Q&A system can provide association-based anonymity for content contributors. Association-based anonymity provides varying levels of personally identifiable information about a content contributor based on the contributor's relationship to the person viewing the contribution. Types of contributor/viewer relationships that may influence the presence and amount of personally identifiable information published to a viewer include, without limitation: whether the viewer is a member of the dialog network for the content being viewed; whether the contributor is a member of the dialog network for the content being viewed; whether the viewer and contributor have known social network relationships; user-level privacy preferences configured by the contributor; and whether the contributor has affirmatively requested to limit disclosure of personally identifiable information on a system-wide or dialog level.

In an exemplary embodiment, some amount of a contributor's personally-identifiable information, such as first and last name, will always be visible to all members of a dialog network for which they are part of, and that information will be visible to other members of the dialog network with each post they make to that question, thereby providing a level of accountability to the contributor. Other personally identifiable information that can be made available in connection with a contributor's content contribution includes email or other electronic contact address, system username, and/or a hyperlink to a biographical profile of the author. However, contributors can choose (via a default setting and/or on a post-by-post basis) to withhold personally identifiable information from content viewers that are not a part of the dialog network (i.e. not an asker or targeted recipient). This enables contributors to speak freely to a known audience (the dialog network), while still making their valuable user-generated content available to a broader audience, anonymously.

Embodiments also enable authors to specify a private dialog mode when posting their question. Private dialog mode overrides any profile or post-level anonymity settings of the asker and all recipients to ensure that all contributions to a dialog from those users are maintained anonymously to viewers outside the dialog network (i.e. individuals other than the asker and targeted recipients). Private dialog mode may be desirable to minimize any risk of unintentional identification of content authors through known personal associations. In this way, Private Dialogs introduce a new form of pseudo-privacy, or public privacy, where the asker and recipients are free to engage amongst each other with full knowledge of who they are communicating with, perhaps even appearing to them as if they are in a private room amongst only one another and free to speak accordingly, while the rest of the world can look in on that conversation but have no knowledge of who is having it. To the extent the asker or recipients have their view restricted to only see posts from other members of that dialog network (default view), it will further appear to them as if they are having a private group conversation. However, the knowledge and opinions that are generated are available for the rest of the world to access and even contribute to.

In some circumstances, it may further be desirable to enable a private dialog mode in which respondent identities are withheld from everybody except the original asker, including being withheld from other dialog network members. This functionality may be particularly valuable in circumstances where, e.g., question recipients are each knowledgeable but knowingly hold differing viewpoints, and the potential for conflict amongst individuals known to have differing viewpoints could inhibit open communications by potential contributors who seek to avoid conflict. Meanwhile, the availability of personal attribution to at least the question asker still provides a level of accountability, relative to completely anonymous communication forums.

Figure 10:
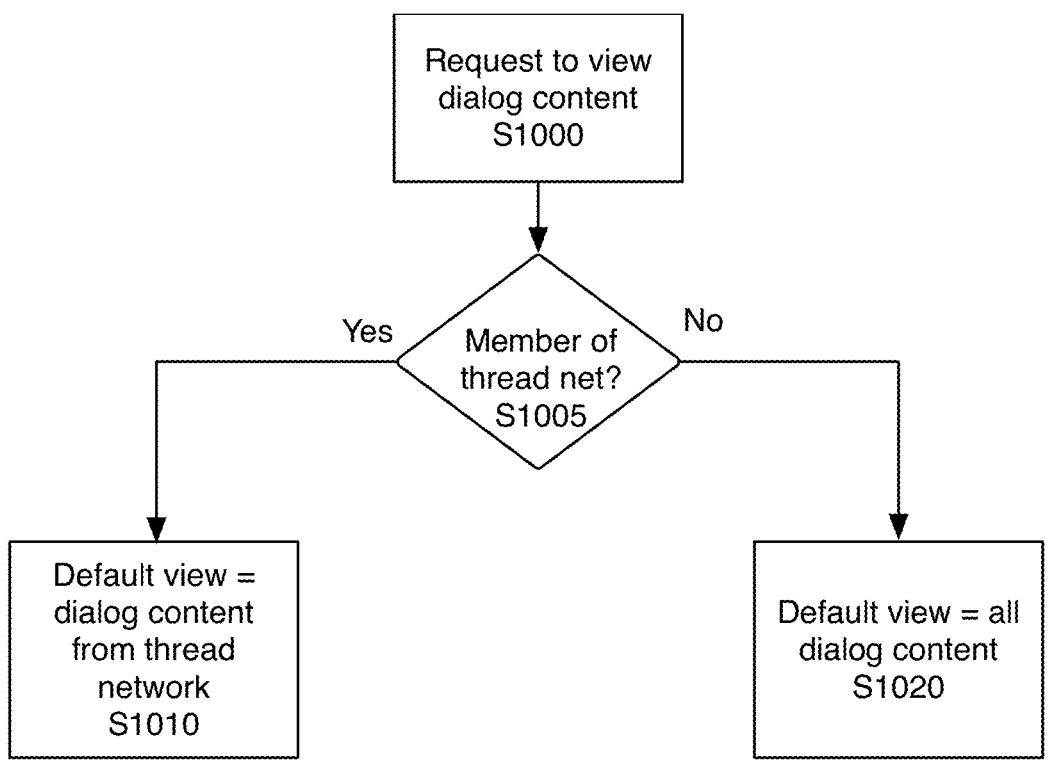
FIG. 10 is a process for determining visibility of content contributor information.

FIG. 10 is a flow chart illustrating a process for determining dialog content included in a user's default view, based on their association with the dialog being viewed. In step S1000, a request to view dialog content (i.e. a query for dialog content) is received by network-connected database 104 within server 100, such as selection of a result from a keyword search of existing dialogs performed via a Q&A system web site implemented by web server 106. In step S1005, a determination is made as to whether the query originator is a member of the dialog network associated with the requested content, e.g., the dialog asker or a member of the asker-specified recipient list associated with the dialog. If so, by default, content returned in response to the query includes dialog content contributed by members of the dialog network (i.e. asker 200 or recipients 202) (step S1010). If not, by default, content returned in response to the query includes dialog content contributed by any user (i.e. asker 200, recipients 202 or external participants 220) (step S1020). Preferably, users can configure broader or narrower views so that, e.g., dialog network members can opt to view content contributed by external participants, or external participants can limit their view to content contributed by dialog network members.

Figure 11:
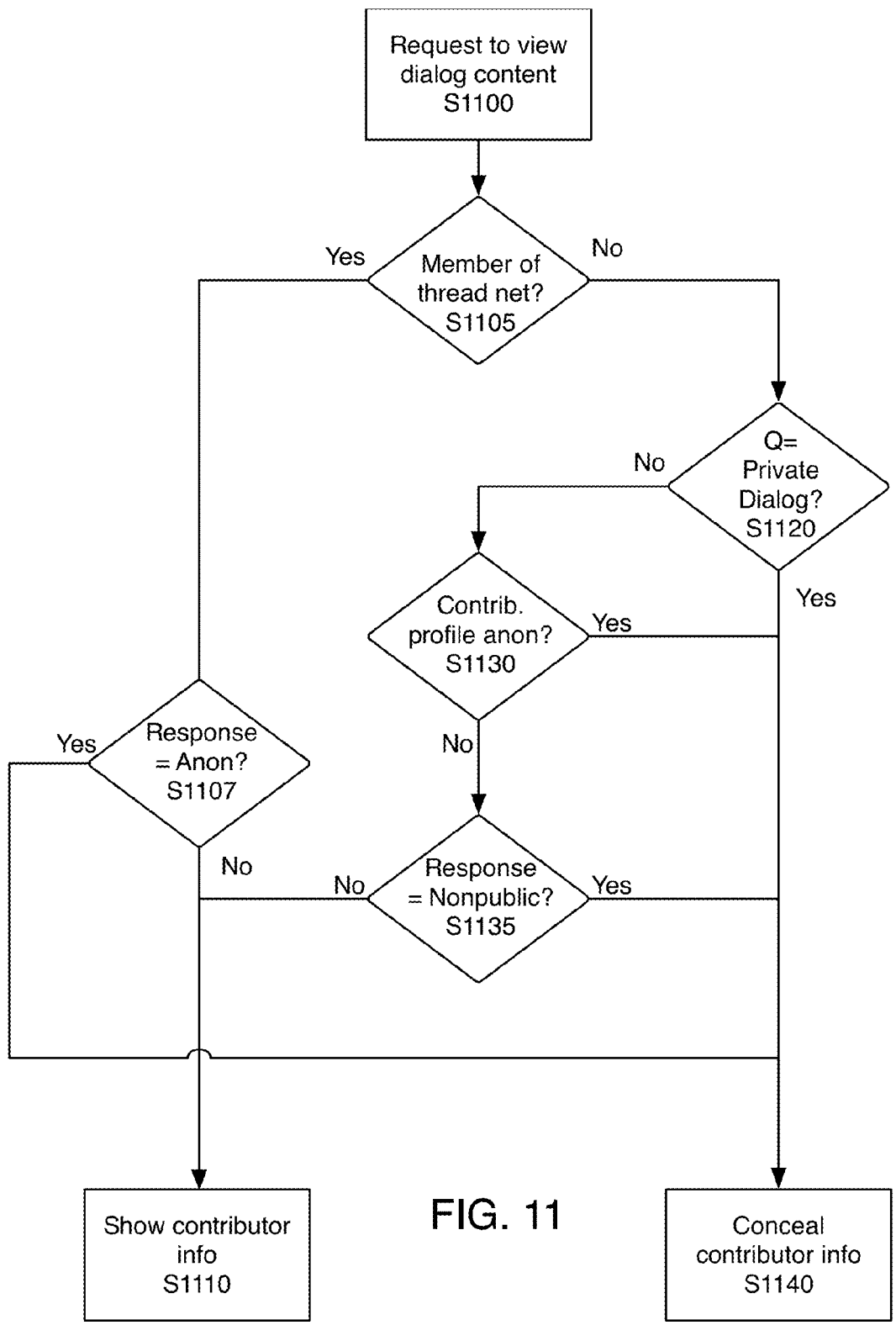
FIG. 11 is a process for determining default view of dialog content.

FIG. 11 is a flow chart illustrating a process for determining visibility of personally identifiable information associated with content contributors (such as biographical information), in accordance with an exemplary embodiment. In step S1100, a request to view dialog content (i.e. a query for dialog content) is received by network-connected database 104 within server 100, such as selection of a result from a keyword search of existing dialogs performed via a Q&A system web site implemented by web server 106. In step S1105, a determination is made as to whether the query originator is a member of the dialog network associated with the requested content, e.g. the dialog asker or a member of the recipient list associated with the dialog. If the viewer is a dialog network member, a further determination is made as to whether the content contributor requested that their identity be withheld from everyone except the question asker (S1107). If not, content returned in response to the query includes personally identifiable information corresponding to content contributors (step S1110). If so, the content item returned in response to the query excludes personally identifiable information (step S1140).

If the viewer is not a dialog network member, a post-level determination is made as to whether a private dialog mode was selected for the question by the asker (step S1120). If so, personally identifiable information corresponding to the content contributor is withheld from the query response (step S1140). If not, in step S1130 a determination is made for each element of dialog content as to whether the content contributor's system profile (if any) is configured, at a profile level, to maintain anonymity (e.g. to withhold personally identifiable information from individuals outside the thread network). If so, personally identifiable information corresponding to that content contributor is withheld from the query response (step S1140). If not, a determination is made as to whether the content contributor identified the contribution as non-public in connection with submission of the specific element of content requested (step S1135). If so, personally identifiable information corresponding to the content contributor is withheld from the query response (step S1140). If not, content is returned inclusive of personal information associated with its contributor (step S1110).

User interface elements enabling implementation of association-based anonymity functionality described above are illustrated in embodiments of FIGS. 4 and 6. For instance, in the "new question" user interface embodiment of FIG. 4, check box 440 is provided for an asker to select or unselect "Private Dialog" for the question at issue. Selection of check box 440 triggers a "YES" response in step S1120 of the method of FIG. 11. De-selection of check box 440 triggers a "NO" response in step S1120 of the method of FIG. 11. Similarly, the answer form user interface of FIG. 6 includes check box 635 labeled "Withhold my identity from the public" beneath the list of individuals involved in a dialog. Selection of check box 635 triggers a "YES" response in step S1135 of the method of FIG. 11. De-selection of check box 635 triggers a "NO" response in step S1135 of the method of FIG. 10. The answer form of FIG. 6 also includes check box 636 labeled "Conceal my identity from everybody except <Asker>, who originally asked this question." Selection of check box 636 triggers a "YES" response in step S1107. De-selection of check box 636 triggers a "NO" response in step S1107. Thus, in combination with the process of FIG. 11, user interface elements 440, 635 and 636 operate to provide association-based anonymity on a conversation-level or post-level, respectively.

The ability to view personally identifiable information about content contributors is, more broadly, an example of a special privilege that can be made available or withheld from users based on their association with a dialog. Other potential association-based special privileges include the ability to add additional individuals to the dialog as dialog network members, the ability to promote external user posts to the dialog network members via push notification, the ability to promote external user posts to the dialog network members by flagging an external post for inclusion within views that are otherwise limited to dialog network content, bypassing moderation or contribution approval processes, or being displayed within a user interface as a "member" as opposed to a "non-member."

While certain system infrastructure elements are illustrated in particular configurations, it is understood and contemplated that functional elements described herein can be readily integrated and/or implemented via various alternative hardware or software abstractions, as would be known to a person of skill in the field of information systems design. For example, while some of the above described embodiments include presentation of content via a web browser, it is contemplated and understood that a standalone PC application, or a smart phone or tablet computer app, could be implemented in order to present content as described hereinabove. These and other variations are contemplated.

Moreover, while certain embodiments of the invention have been described herein in detail for purposes of clarity and understanding, the foregoing description and Figures merely explain and illustrate the present invention and the present invention is not limited thereto. It will be appreciated that those skilled in the art, having the present disclosure before them, will be able to make modifications and variations to that disclosed herein without departing from the scope of any appended claims.

What is claimed is:

1. An electronic communication service hosted on one or more servers communicating with a plurality of user devices via one or more digital communication networks, the servers having one or more processors and memory storing instructions which, when executed by the processors, cause the servers to perform a method comprising:
   receiving user-input from an opening user via communication between a user device associated with said opening user and one or more of said servers, the user-input to include opening dialog content and specification of electronic contact addresses associated with a plurality of target responders;
   transmitting electronic notifications to one or more user devices associated with each of the target responders by one or more of said servers, the notifications each containing user identifiers associated with the notification recipient;
   receiving by one or more of the servers, a communication responsive to one of said notifications from a user device associated with a responding one of said target responders, the responsive communication including the user identifier associated with the responding target responder;
   in response to receiving said responsive communication, configuring default communication preferences associated with said responding target responder such that said servers subsequently transmit push notifications of new dialog content to said responding target responder when said servers receive responses containing further content for that dialog from the opening user or other target responders.

2. The electronic communication service of claim 1, in which the step of receiving by one or more of the servers, a communication responsive to one of said notifications comprises receiving a request containing a dialog identifier and the user identifier.

3. The electronic communication service of claim 1, in which the step of receiving by one or more of the servers, a communication responsive to one of said notifications comprises the servers querying the responding target responder for the user identifier.

4. The electronic communication service of claim 1, in which the step of transmitting electronic push notifications further comprises the step of transmitting electronic push notifications to said electronic contact addresses associated with the plurality of target responders, and in which said user identifiers are embedded within uniform resource locators.

5. The electronic communication service of claim 4, further comprising the step of transmitting push notifications via email to target responders associated with an electronic contact address comprised of an email address.

6. The electronic communication service of claim 4, further comprising the step of transmitting push notifications via mobile network messaging service to target responders associated with an electronic contact address comprised of a mobile telephone number.

7. An electronic communication service hosted on one or more servers communicating with a plurality of user devices via one or more digital communication networks, the servers having one or more processors and memory storing instructions which, when executed by the processors, cause the servers to perform a method comprising:
   receiving user-input from an opening user via communication between a user device associated with said opening user and one or more of said servers, the user-input to include opening dialog content and specification of electronic contact addresses associated with a plurality of target responders;
   transmitting electronic push notifications to one or more user devices associated with each of the target responders by one or more of said servers, the notifications containing user identifiers associated with the notification recipient;
   receiving by one or more of the servers, a communication responsive to said notifications from a user device associated with a responding one of said target responders, the responsive communication including the user identifier associated with the responding target responder;
   transmitting by one or more of the servers, a query to an electronic device associated with said responding target responder, the query enabling said responding target responder to configure whether to receive push notifications of future content contributions to that dialog.

8. The electronic communication service of claim 7, in which the query comprises an option to receive push notifications of future content contributions to that dialog by the opening user.

9. The electronic communication service of claim 7, in which the query comprises an option to receive push notifications of future content contributions to that dialog by other target responders.

10. The electronic communication service of claim 7, in which the query comprises an option to receive push notifications of future content contributions to that dialog by external users.

11. The electronic communication service of claim 7, the method further comprising:
    configuring by the servers whether to transmit push notifications to the responding target responder of future dialog content contributions by the opening user or other target responders based on a response to said query.

12. An electronic communication service hosted on one or more servers communicating with a plurality of user devices via one or more digital communication networks, the servers having one or more processors and memory storing instructions which, when executed by the processors, cause the servers to perform a method comprising:
    receiving user-input from an opening user via communication between a user device associated with said opening user and one or more of said servers, the user-input to include (a) opening dialog content, and (b) specification of electronic contact addresses, each associated with an individual person, collectively comprising a plurality of target responders;
    transmitting electronic notifications of the opening user submission of dialog content to one or more user devices associated with the target responders by one or more of said servers;
    receiving a communication responsive to one of said notifications from a user device associated with a responding one of said target responders;
    transmitting electronic notifications of said responsive communication to the opening user and target responders who have not previously opted out of receiving push notifications of dialog content;

making at least a portion of the opening dialog content and the responsive communication available to the opener, target responders and external users, via a request to a networked database.

13. The electronic communication service of claim 12, in which the step of making at least a portion of the opening dialog content and the responsive communication publicly available via a request to a networked database comprises making the opening dialog content and content from the responsive communication available via an Internet web site.

14. The electronic communication service of claim 12, in which the step of publishing the opening dialog content and responsive communication is further comprised of making the opening dialog content and content from the responsive communication available via query within a mobile device application executed on a user device and communicating with one or more of said servers.

15. The electronic communication service of claim 12, in which said electronic notifications of said responsive communication excludes disclosure of the electronic contact address of the responding target responder.

16. The electronic communication service of claim 12, in which said electronic notifications of the opening user submission of dialog content excludes disclosure of the electronic contact addresses associated with target responders other than the responding target responder.

17. An electronic communication service hosted on one or more servers communicating with a plurality of user devices via one or more digital communication networks, the servers having one or more processors and memory storing instructions which, when executed by the processors, cause the servers to perform a method comprising:
   receiving user-input from an opening user via communication between a user device associated with said opening user and one or more of said servers, the user-input to include opening content initiating a dialog and specification of electronic contact addresses associated with a plurality of target responders;
   transmitting electronic notifications to one or more user devices associated with each of the target responders by one or more of said servers;
   receiving by one or more of the servers, a communication responsive to any dialog content from a responding user device associated with a responding member of a group comprising the target responders and external users;
   in response to receiving said responsive communication, configuring communication preferences associated with said responding member such that said servers subsequently transmit push notifications of new dialog content to said responding member when said servers receive responses containing new dialog content from the opening user or qualifying other responders.

18. The electronic communication service of claim 17, in which the qualifying other responders consist of the target responders.

19. The electronic communication service of claim 17, in which the qualifying other responders comprise the target responders and external users.

20. The electronic communication service of claim 17, in which the qualifying other responders comprise the opening user.

21. The electronic communication service of claim 17, in which the step of configuring communication preferences is performed automatically by the servers without requiring further interaction with the responding user.

22. The electronic communication service of claim 17, in which the step of configuring communication preferences is comprised of the initial substep of querying the responding user as to whether subsequent push notifications should be transmitted.

* * * * *